US010826886B2

(12) United States Patent
Pattar et al.

(10) Patent No.: US 10,826,886 B2
(45) Date of Patent: Nov. 3, 2020

(54) TECHNIQUES FOR AUTHENTICATION USING PUSH NOTIFICATIONS

(71) Applicant: Oracle International Corporation, Redwood Shores, CA (US)

(72) Inventors: Nagaraj Pattar, Gulbarga (IN); Pruthvithej Ramesh Kumar, Gulbarga (IN)

(73) Assignee: Oracle International Corporation, Redwood Shores, CA (US)

( * ) Notice: Subject to any disclaimer, the term of this patent is extended or adjusted under 35 U.S.C. 154(b) by 224 days.

(21) Appl. No.: 15/992,366

(22) Filed: May 30, 2018

(65) Prior Publication Data

US 2019/0372959 A1 Dec. 5, 2019

(51) Int. Cl.
*H04L 29/06* (2006.01)
*H04L 29/08* (2006.01)

(52) U.S. Cl.
CPC ........ *H04L 63/0815* (2013.01); *H04L 63/083* (2013.01); *H04L 67/26* (2013.01); *H04L 67/10* (2013.01); *H04L 67/42* (2013.01)

(58) Field of Classification Search
CPC ... H04L 63/0815; H04L 67/26; H04L 63/083; H04L 67/42
USPC .......................................................... 726/7
See application file for complete search history.

(56) References Cited

U.S. PATENT DOCUMENTS

| 2014/0164118 | A1 | 6/2014 | Polachi | |
| 2015/0025874 | A1* | 1/2015 | Matute | H04W 12/0608 704/4 |
| 2015/0025970 | A1 | 1/2015 | Ogawa | |
| 2019/0188368 | A1* | 6/2019 | Hastings | H04L 63/0492 |

* cited by examiner

*Primary Examiner* — Evans Desrosiers
(74) *Attorney, Agent, or Firm* — Kilpatrick Townsend & Stockton LLP

(57) ABSTRACT

The present disclosure relates to techniques for authentication of a user on a restricted website, or on an enterprise network with single sign-on, or on various other service systems with security restrictions using push notifications. One technique includes receiving an authorization request for a first application to access a resource, sending a first push notification to a second application, the first push notification requesting authentication of a user of the first application, receiving information indicating a response to the first push notification, sending a second push notification to the first application, the second push notification includes a status of the authorization request based on the response to the first push notification, receiving information indicating an outcome of the authentication request based on the response to the first push notification, and providing the first application access to the resource.

20 Claims, 7 Drawing Sheets

TECHNIQUES FOR AUTHENTICATION USING PUSH NOTIFICATIONS

FIELD OF THE INVENTION

The present disclosure relates generally to access control, and more particularly, to techniques for authentication of a user on a restricted website, or on an enterprise network with single sign-on, or on various other service systems with security restrictions using push notifications.

BACKGROUND

A use of a single specific authentication method such as a password authentication or the digital certificate authentication at a level of authentication is known as single-factor authentication that identifies the user requesting access through only one category of credentials. Single-factor authentication for a system typically only requires a user to create an account by providing a username and associated password (e.g., a knowledge factor only authentication). Since passwords can easily end up in the wrong hands, this approach is not very secure. Therefore, enterprises and high-value web service providers such as banks often require alternative single factor authentication techniques or multi-factor authentication, e.g., at least a second factor, specifically for higher sensitive resources (e.g., higher level authentication applications). The multi-factor approach requires a user to present at least two factors of identification from a set of factors potentially including: (1) a knowledge factor; (2) a possession factor; and (3) an inherence factor. The knowledge factor refers to something the user knows, for instance a password, pin code or passphrase; the possession factor refers to something the user owns, for instance a security fob, a magnetic card, a cell phone, or a tablet computer; and the inherence factor refers to something the user is. The inherence factor could be determined using biometrics such as fingerprint, iris or voice analysis.

Single factor and multi-factor authentication techniques that include use of a username and associated password have proven to be cumbersome and bad security practice. In fact, many users and enterprises are looking at password-free technologies as their preferred method of authentication, both from a security and ease-of-use perspective. Among the most prominent password-free authentication methods are push notifications. Many enterprises have already provided push notification authentication alternatives for their consumer-facing products. Push notification authentication validates login attempts by sending access requests to an associated device (a possession factor). When a user registers their account, the user links the account to a device they possess. Afterwards, whenever the user tries to log in to their account, the user submits their username or ID. In addition to (multi-factor authentication) or instead of entering their password (single factor authentication), the user receives an access request notification on their device, which the user can approve or decline. The benefits of push notification authentication is that user does not need to memorize and manage passwords, and the notification provides a seamless and user-friendly experience. Additionally, validating an authentication request is often quicker using push notifications than entering a complex user name and password.

Conventionally, it is difficult to complete the push notification based authentication without polling notification status and without persisting notification data on the server. For example, when a user initiates an action that requires authentication (e.g., requesting access to a protected resource), the user's browser sends a request to a server to initiate the action. The server determines based on one or more authentication/authorization policies that the action requires authentication (e.g., single factor authentication or second factor authentication) and that the authentication method includes use of a push notification. The server sends a push notification to the registered user device. Until the push notification is approved, the browser keeps on polling for the status of the initiated request. As long as the request is not approved, the browser keeps on polling the server at regular intervals. These polling requests can be bulky and cause heavy load on the system. If there are a number of simultaneous authentication requests (e.g., login requests), then the server will end up serving an overwhelming number of polling requests. Accordingly, new techniques are desired for completing push notification based authentication without use of polling for the status of the initiated request.

BRIEF SUMMARY

Systems, methods and computer-readable memory for controlling access to resources accessible in a distributed environment are described. Certain techniques are described for authentication of a user on a restricted website, or on an enterprise network with single sign-on, or on various other service systems with security restrictions using push notifications.

In various embodiments, a method is provided comprising receiving, at a server, an authorization request for a first application to access a resource; sending, by the server, a first push notification to a second application, the first push notification requesting authentication of a user of the first application; receiving, at the server, information indicating a response to the first push notification; sending, by the server, a second push notification to the first application, the second push notification includes a status of the authorization request based on the response to the first push notification; receiving, at the server, information indicating an outcome of the authentication request based at least on the response to the first push notification; and providing, by the server, the first application access to the resource.

In some embodiments, the method further comprises determining, by the server, whether the user of the first application has registered the second application for push notification authentication; and when the user has registered the second application for push notification authentication, sending, by the server, an initial notification on the status of the authorization request and a transaction unique identifier to the first application. The initial notification informs the first application that the authorization request requires the push notification authentication and wait for either: (i) receipt of the second push notification, or (ii) a time-out period to have expired.

In some embodiments, the method further comprises composing, by the server, a message for the first push notification, where the message requests confirmation of an identity of the user; and preparing, by the server, notification data for the first push notification, where the notification data includes a unique identifier for the second application and contents for a call back to the first application, and where the contents for the call back include the transaction unique identifier; and generating, by the server, the first push notification using at least the message and the notification data.

Optionally, the sending the first push notification comprises sending, by the server, the first push notification to a push notification service via an application program interface, and where the server is registered with the push notification service. Optionally, the response to the first push notification confirms the identity of the user, and the response to the first push notification is signed with a digital signature.

In some embodiments, the method further comprises composing, by the server, a message for the second push notification, where the message includes the status of the authorization request based on the response to the first push notification; and preparing, by the server, notification data for the second push notification, where the notification data includes a unique identifier for the first application and the transaction unique identifier; and generating, by the server, the second push notification using at least the message and the notification data. Optionally, the outcome of the authentication request is a validation of credentials of the user, and where the credentials include at least the response to the first push notification.

In various embodiments, a system is provided comprising a distributed environment that includes a server comprising a resource, one or more processors, and non-transitory machine readable storage medium having instructions stored thereon that when executed by the one or more processors cause the one or more processors to perform the process comprising: receiving, at the server, an authorization request for a first application on a client device to access the resource; sending, by the server, a first push notification to a second application via a push notification service, the first push notification requesting authentication of a user of the first application; receiving, at the server, information indicating a response to the first push notification; sending, by the server, a second push notification to the first application via the push notification service, the second push notification includes a status of the authorization request based on the response to the first push notification; receiving, at the server, information indicating an outcome of the authentication request based at least on the response to the first push notification; and providing, by the server, the first application access to the resource.

In some embodiments, the process further comprises determining, by the server, whether the user of the first application has registered the second application for push notification authentication; and when the user has registered the second application for push notification authentication, sending, by the server, an initial notification on the status of the authorization request and a transaction unique identifier to the first application. The initial notification informs the first application that the authorization request requires the push notification authentication and wait for either: (i) receipt of the second push notification, or (ii) a time-out period to have expired.

In some embodiments, the process further comprises composing, by the server, a message for the first push notification, where the message requests confirmation of an identity of the user; and preparing, by the server, notification data for the first push notification, where the notification data includes a unique identifier for the second application and contents for a call back to the first application, and where the contents for the call back include the transaction unique identifier; and generating, by the server, the first push notification using at least the message and the notification data.

Optionally, the sending the first push notification comprises sending, by the server, the first push notification to a push notification service via an application program interface, and where the server is registered with the push notification service. Optionally, the response to the first push notification confirms the identity of the user, and the response to the first push notification is signed with a digital signature.

In some embodiments, the process further comprises composing, by the server, a message for the second push notification, where the message includes the status of the authorization request based on the response to the first push notification; and preparing, by the server, notification data for the second push notification, where the notification data includes a unique identifier for the first application and the transaction unique identifier; and generating, by the server, the second push notification using at least the message and the notification data. Optionally, the outcome of the authentication request is a validation of credentials of the user, and where the credentials include at least the response to the first push notification.

In various embodiments, a non-transitory machine readable storage medium is provided having instructions stored thereon that when executed by one or more processors cause the one or more processors to perform the method comprising: receiving an authorization request for a first application to access a resource; sending a first push notification to a second application, the first push notification requesting authentication of a user of the first application; receiving information indicating a response to the first push notification; sending a second push notification to the first application, the second push notification includes a status of the authorization request based on the response to the first push notification; receiving information indicating an outcome of the authentication request based at least on the response to the first push notification; and providing the first application access to the resource.

In some embodiments, the method performed further comprises determining whether the user of the first application has registered the second application for push notification authentication; and when the user has registered the second application for push notification authentication, sending an initial notification on the status of the authorization request and a transaction unique identifier to the first application. The initial notification informs the first application that the authorization request requires the push notification authentication and wait for either: (i) receipt of the second push notification, or (ii) a time-out period to have expired.

In some embodiments, the method performed further comprises composing a message for the first push notification, where the message requests confirmation of an identity of the user; and preparing notification data for the first push notification, where the notification data includes a unique identifier for the second application and contents for a call back to the first application, and where the contents for the call back include the transaction unique identifier; and generating the first push notification using at least the message and the notification data.

Optionally, the sending the first push notification comprises sending the first push notification to a push notification service via an application program interface, and where the server is registered with the push notification service. Optionally, the response to the first push notification confirms the identity of the user, and the response to the first push notification is signed with a digital signature.

In some embodiments, the method performed further comprises composing a message for the second push notification, where the message includes the status of the authorization request based on the response to the first push notification; and preparing notification data for the second push notification, where the notification data includes a unique identifier for the first application and the transaction unique identifier; and generating the second push notification using at least the message and the notification data. Optionally, the outcome of the authentication request is a validation of credentials of the user, and where the credentials include at least the response to the first push notification.

The foregoing, together with other features and embodiments will become more apparent upon referring to the following specification, claims, and accompanying drawings.

DETAILED DESCRIPTION

Figure 1A:
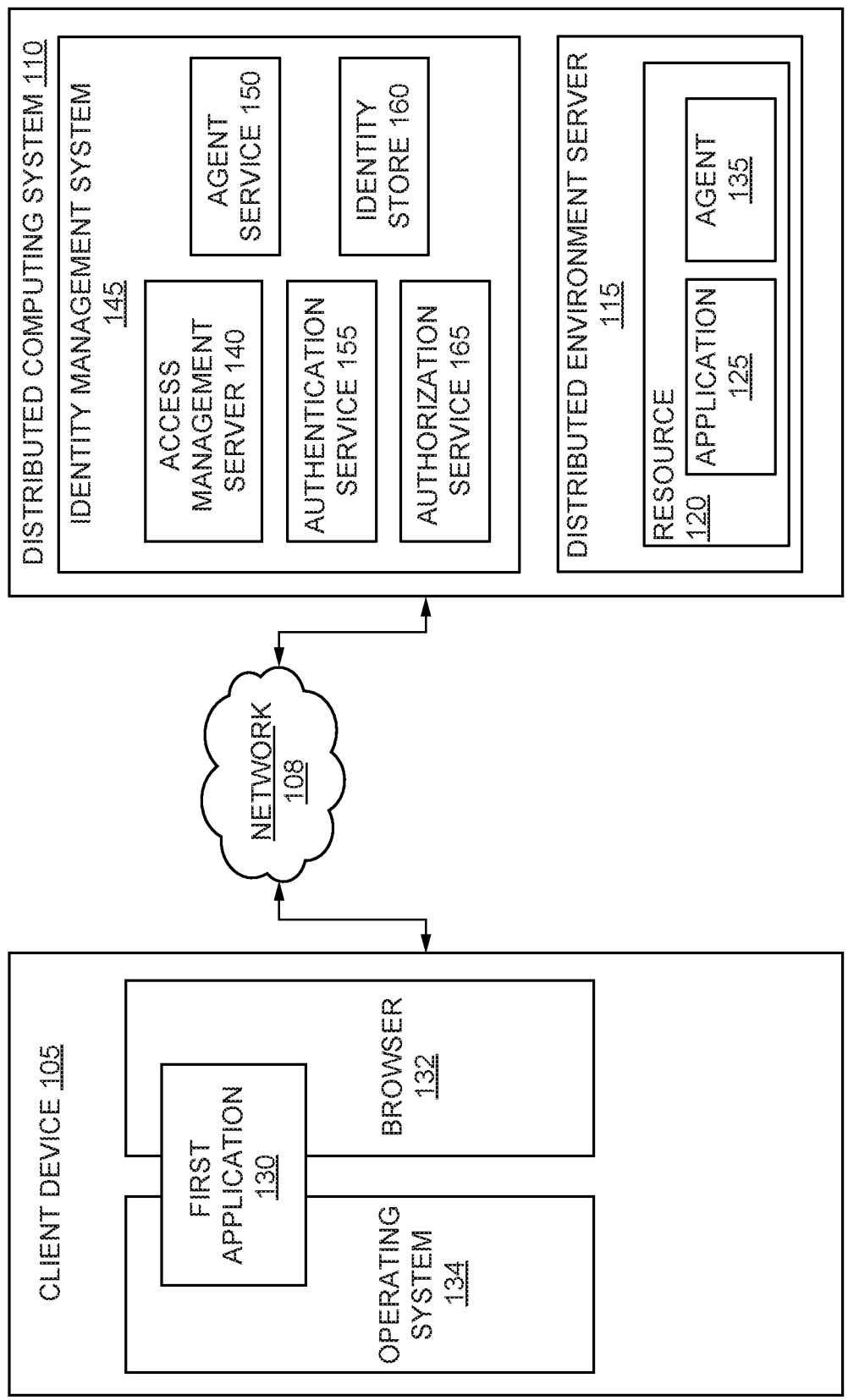
FIG. 1A illustrates a high-level diagram of a system for controlling access to resources in accordance with various embodiments.

In the following description, for the purposes of explanation, specific details are set forth in order to provide a thorough understanding of various embodiments described herein. However, it will be apparent that the various embodiments may be practiced without these specific details. The figures and description are not intended to be restrictive.

INTRODUCTION

The present disclosure relates generally to access control, and more particularly, to techniques (e.g., systems, methods, computer program products storing code or instructions executable by one or more processors) for authentication of a user on a restricted website, or on an enterprise network with single sign-on, or on various other service systems with security restrictions using push notifications. In various embodiments, a method is provided for that includes receiving, at a server, an authentication request for an application (e.g., a web application or web app) to access a resource; sending, by the server, a push notification to an authentication application, the push notification requesting authentication for the application; receiving, at the server, information indicating a response to the push notification; and providing, by the server, access to the application to access the resource based on the received information.

Conventionally, until information indicating a response to the push notification is received at the server, the application (e.g., the web application or web app) keeps polling the server for the status of the initiated request for access to the resource. As long as the push notification is not approved or declined (e.g., the user is busy doing other things and has not completed the authentication process by approving or declining the push notification on the authentication application), the application keeps polling the server. In order to avoid the heavy load on the systems caused by the polling, most of the systems today either: (i) poll the request for notification status at regular intervals, and if the request has not been approved or denied, then sleep the polling for some time and poll for status again after some predetermined time; or (ii) when a request is made to the server for authentication, the server keeps the http request thread blocked synchronously until a response with approved or denied is received or request timeout is elapsed and request fails with timeout exception.

Both of these methods have their own advantages and disadvantages. For polling to be successful, the notification records must be persisted either in cache or persistence database. This adds more database records as the number of authentication transactions increase. Polling the server, every time consumes server computation power, and the higher the frequency of polling, the higher the consumption of server resources, database, central processing units, and network bandwidth. This polling nature not only introduces unnecessary computational resources, but also, reduces server capacity to allow more transactions. In addition, if there is no action by the client application on the notification or the browser is closed, then the server needs to perform an additional job to clean up the database records. In the second approach of blocking a thread, the system blocks incoming requests for a certain time duration. The push notification should be either approved or denied within the time duration. If not, the push notification will timeout. However, blocking an http request for the time duration may have severe disadvantages especially, when proxies are involved. There is a possibility of proxies terminating connection during the time duration. Thus, the system must ensure that all the proxies involved in the middle will support the allowed time duration before the push notification is approved, denied, or timed out. Additionally, blocking an http request at the server limits the number of supported http requests allowed, and there could be possibly server issues due to the number of allowed threads.

To address these problems and provide an improved system to complete push notification, a method is provided comprising receiving, at a server, an authorization request for a first application to access a resource, sending, by the server, a first push notification to a second application, the first push notification requesting authentication of a user of the first application, receiving, at the server, information indicating a response to the first push notification, sending, by the server, a second push notification to the first application, the second push notification includes a status of the authorization request based on the response to the first push notification, receiving, at the server, information indicating an outcome of the authentication request based on the response to the first push notification; and providing, by the server, the first application access to the resource. As used herein, when an action is "triggered by" or "based on" something, this means the action is triggered or based at least in part on at least a part of the something. The proposed solution completes push notification based authentication without any hassle and avoids all the aforementioned disadvantages of prior solutions. Advantageously, the proposed solution does not store notification content (e.g., no storage in the database or cache), and the system is able to manage communication between two parallel processes. Additionally, if required, the prior solutions can be implemented in conjunction with the proposed solution to make authentication system more robust.

Control Access System

The various embodiments described herein may be used in an assortment of different domains and contexts. Certain embodiments are particularly applicable to enterprise application software provided in cloud computing technology. However, the systems and methods described herein may be used to provide access control functionality for any system or application framework that relies on an access manager server for controlling access to resources in a distributed environment.

In some embodiments, systems, methods, and computer-readable media are disclosed for controlling access to resources accessible in a distributed environment. FIG. 1A illustrates a system 100 for managing access to resources in accordance with an exemplary embodiment. Specifically, system 100 provides access among different resources provided within a distributed environment. For example, a user operating a client device 105 may access a network 108 such as an enterprise computer network that includes a distributed computing system 110. The distributed computing system 110 may be implemented using a cloud computing infrastructure. In some embodiments, the distributed computing system 110 may include a distributed environment server 115 (e.g., a cloud server) that delivers computing power and storage capacity as a service to user via a network. Resource 120 (e.g., application and data) is stored on the distributed environment server 115 in an instance that is accessible by the client device 105 via the network. Client device 105 may be a workstation, personal computer (PC), laptop computer, smart phone, wearable computer, or other networked electronic device.

Resource 120 may include, without restriction, a file, a web page, a document, web content, services, a computing resource, or an application. For example, system 100 may include resource 120 such as application 125 and/or content accessible through the application 125. A resource 120 may be requested and accessed using an application 130 (e.g., a first application) on client device 105. For example, the application 130 may request access to a web page from a resource server based on a URL identifying a requested resource. Resource 120 may be provided by one or more computing systems, e.g., a resource server such as distributed environment server 115 that provides access to one or more resources upon authentication of a user in the system 100. In some embodiments, the application 130 is a web application or web app, which is a client-server computer program that the client 105 (including the user interface and client-side logic) runs in a web browser 132. In other embodiments, the application 130 is a desktop or mobile application such as an enterprise application, which is a client side computer program that the client 105 (including the user interface and client-side logic) runs on an operating system 134, and may interface with external networks or servers via the browser 132 or other well-known interfaces.

An access management system may be implemented in system 100 according to an agent-server model for enabling communication between client device 105 and the distributed environment server 110 to provide access control functionality over resource 120. The agent-server model may include an agent component (e.g., security agent 135 also known as a single sign-on agent or policy-enforcement agent) and a server component (e.g., access manager server 140 also known as a single sign-on server or policy server).

The security agent 135 may be deployed with the resource 120 as a plugin or as a portion of the resource 120, or the security agent 130 may be provisioned separate from the resource 120, for example, running on a web server in front of the resource 120. The access manager server 140 may be deployed as a part of an identity management system 145. The identity management system may further comprise agent service 150, authentication service 155, identity store 160, and authorization service 165.

The security agent 135 and the access manager server 140 may work in combination to provide user access control and protect resources within the enterprise computer network against external and internal web-based threats. For example, the access manager server 140 may serve as the decision component for controlling access to the resource 120, and the security agent 135 may implement or operate as the enforcement component for controlling access to the resource 120. In some embodiments, the security agent 135 may be application language binding specific, and thus, the security agent 135 could be used for protecting multiple applications written in the same language and sharing the same endpoints (e.g., uniform resource identifier (URI)).

The access management system enables authentication/authorization (e.g., single sign-on (SSO)) functionality within a distributed environment, and may perform various access control related functions for managing access to resources within the distributed environment. For example, security agent 135 and access manager server 140 may perform authentication (e.g., single level, single factor, multi-level, and/or multi-factor authentication) of a user operating the client device 105. Authentication is the process by which a user is verified to determine that he/she is who he/she claims to be. In some embodiments, the access management system receives a request from a user in response to the user sending the request to access management system from a client device. In other embodiments, the access management system receives a request from users in response to the access management system intercepting the request. To authenticate a user, the access management system (e.g., using security agent 135 and access manager server 140) may present a user with a request for authentication credentials in the form of a challenge (e.g., via the user's web browser or via another application). Authentication policies may specify the authentication methodology (e.g., level and/or factors) to be used for authenticating the user for whom the access must be provided on a given resource. The policies define the way in which the resource access is to be protected (e.g., type of encryption, or the like). For example, the rules of a policy may dictate that single or multi-factor authentication be performed that includes a possession factor authentication via a push notification. The access management system may further determine authorization of a user to access a resource. Authorization is the process of determining if a user has a right to access a requested resource. Authorization policies may be defined that specify the conditions under which a user or group of users has access to a resource. For example, an administrator may only authorize certain users within a group to access particular resources.

FIG. 1A further illustrates an example of a SSO session managed within a distributed environment implementing an access management system comprising security agent 135 and access manager server 140. For example, a user may operate client device 105 to request access to resource 120 controlled by distributed environment server 115. The request may be routed to or intercepted by security agent 135, which controls access to resource 120. In some embodiments, some resources managed by the security agent 135 are not protected, in which case security agent 135 will query the access manager server 140 to determine if the requested resource is protected. The access manager server 140 checks relevant authentication policies for the resource 120 to determine whether authentication is required for access to the resource 120. If the requested resource 120 is protected and requires authentication for use, the access manager server 140 may determine whether any session exists for the user. Upon determining that no session has been established for the user, the user may be forwarded by the access manager server 140 to a login service (e.g., authentication service 155) of the identity management system 145. The authentication service 155 may request authentication credentials (e.g., user name/password, accept or decline a push notification, or the like) from the user. The authentication service 155 may authenticate the user upon receiving the proper authentication credentials by validating the credentials against those stored in a user directory or identity store 160.

Based on receiving the proper authentication credentials for the user, the access manager server 140 may forward the user back to the security agent 135, the security agent 135 may check the authentication, and establish a first session for user upon authentication of the user. As a result, the user is logged into the distributed environment server 115 for the session. Once logged in, the user may access resources to which the user is authorized to access, such as running different applications, accessing cloud storage, or the like. Once the user is logged into the distributed environment server 115, the access manager server 140 creates a cookie that tracks session activity for the user. The cookie may include a length of time that the user has been active on a session. The cookie may be stored as session activity data within the identity management system 145.

Upon determining that the user is authenticated for a SSO session, security agent 135 may process the original request for resource 120 by directing an authorization query to the access manager server 140. The access manager server 140 checks relevant authorization policies for the resource 120 to determine whether the user is authorized to access to the resource. The access manager server 140 responds to the security agent 135 with an allow or deny message based on the authorization policies. Upon determining that the user is allowed access to the resource 120, the security agent 135 allows the request from the client device 105 for access to the resource 120 to go through and the user can access the resource 120 on the distributed environment server 115 via client device 105. Upon determining that the user is denied access to the resource 120, the security agent 135 notifies the client 105 that access to the resource 120 for the user is not permitted.

Push Notification Framework

Figure 1B:
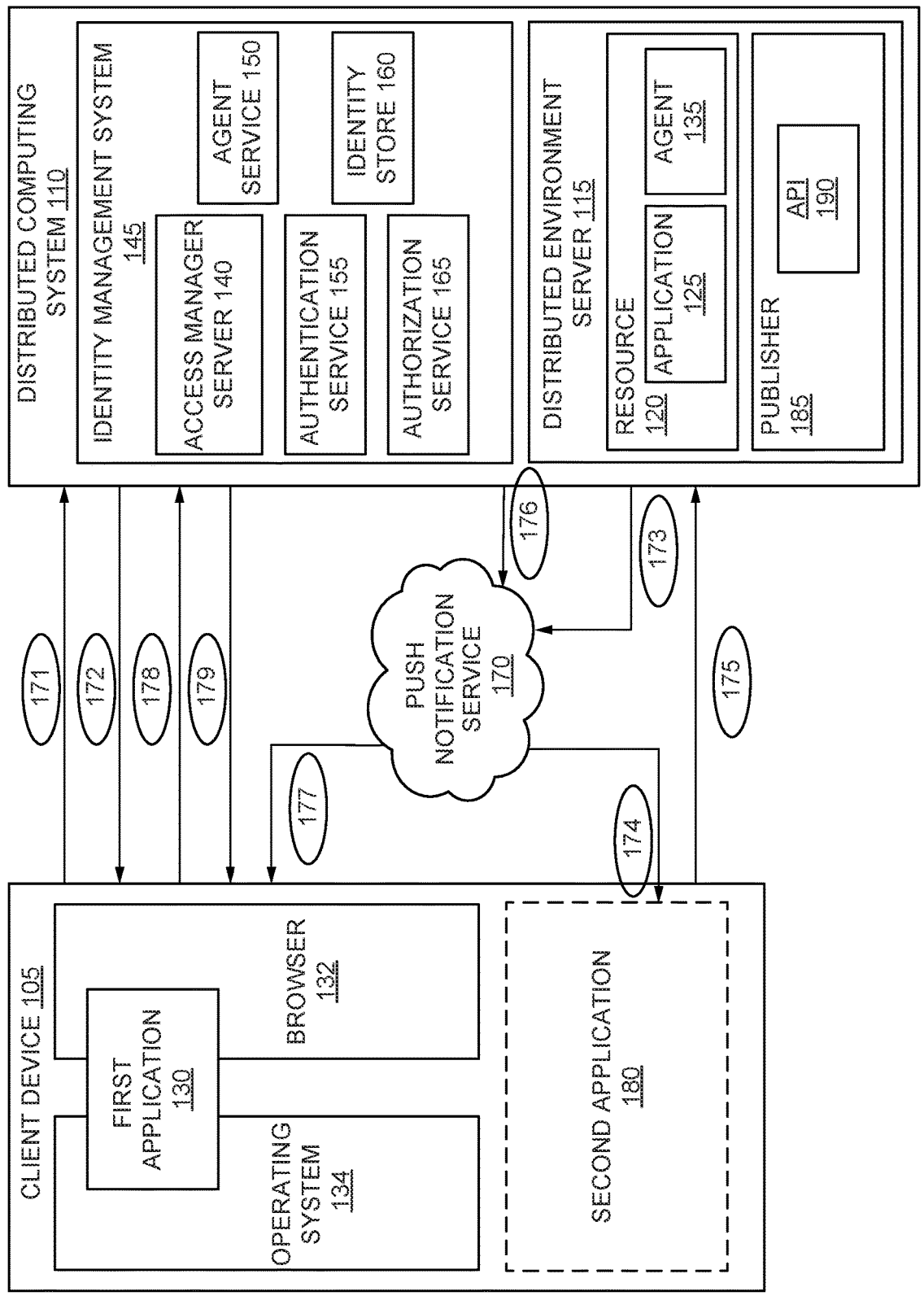
FIG. 1B illustrates a high-level diagram of a system for controlling access to resources using a push notification system in accordance with various embodiments.

In various embodiments, systems, methods, and computer-readable media are disclosed for authentication of a user on a restricted website, or on an enterprise network with single sign-on, or on various other service systems with security restrictions using push notifications. FIG. 1B illustrates a framework for push notification authentication in accordance with an exemplary embodiment using system 100 as described with respect to FIG. 1A. Specifically, system 100 may be configured to provide push notification authentication for different resources provided within a distributed environment using a first application 130, a push notification service 170, and authentication application 180 (e.g., a second application). In various embodiments, the push notification service 170 is a platform notification service that enables the access management system (e.g., the authentication service 155) or the distributed environment server 115 to send notification data to applications installed on client devices. The authentication service 155 or the distributed environment server 115 may comprise a notification publisher 185 that is registered with the push notification service 170 and has an application programming interface 190 (API) to the push notification service 170 in order for the notification publisher 185 to communicate with the push notification service 170. The notification publisher 185 may be configured to compose push notifications and send the push notifications to client devices via the API 190.

In some embodiments, the first application 130 is a web application, desktop application, or mobile application on the client device 105. The first application 130 may be configured to determine whether it may receive push notifications. For example, the first application 130 may communicate with a browser 132 of the client device 105 and check whether it can receive push notifications. In other embodiments, the first application 130 is self-aware (e.g., an enterprise application) that it can receive push notifications. If the first application 130 can receive push notifications, then the first application 130 registers itself to receive push notifications. For example, unique identifiers (IDs) for the first application 130 and/or the client device 105, are registered with the push notification service 170. The unique identifiers may be passed back to the first application 130 from the push notification service 170. The unique identifiers may also be sent to the notification publisher 185, which receives and stores the registration details including the unique identifiers. This browser 132 may provide APIs for the first application 130 to register for incoming push notifications, or the first application 130 may have the APIs for the registration. As a result of the registration, the first application 130 may receive information such as a registration token from the notification service 170 and configure a listener of the first application 130 with the token to receive incoming notifications from notification publisher 185 via the notification service 170.

In some embodiments, the second application 180 is a web application, desktop application, or mobile application on a client device configured to receive incoming push notifications and display the notification to a user. The second application 180 may be implemented on the client device 105, or the second application 180 may be remote from client device 105 and implemented on another client device (e.g., a user's mobile device). The another client device may be a workstation, personal computer (PC), laptop computer, smart phone, wearable computer, or other networked electronic device. In some embodiments, the user registers the second application 180 to receive push notifications for authentication on the access management system. In other embodiments, the second application 180 registers itself to receive push notifications for authentication on the access management system. For example, unique identifiers for the second application 180 and/or the client device 105 or another client device, are registered with the push notification service 170. The unique identifiers may be passed back to the second application 180 from the push notification service 170. The unique identifiers may also be sent to the notification publisher 185, which receives and stores the registration details including the unique identifiers. As a result of the registration, the second application 180 may receive information such as a registration token from the notification service 170 and configure a listener of the second application 180 with the token to receive incoming notifications from notification publisher 185 via the notification service 170.

FIG. 1B further illustrates an example of a push notification authentication session managed within a distributed environment implementing an access management system and push notification service 170. For example, a user may operate client device 105 to request access to resource 120 controlled by a distributed environment server 115. At step 171, the first application 130 (e.g., a web application) may be used by a user of the client device 105 to make an authentication request to a resource server such as the distributed environment server 115 for access to the resource 120. The distributed environment server 115 may call a login service (e.g., authentication service 155) of the identity management system 145 to evaluate an authentication policy for the requested resource 120. The login service returns the authentication policy based on the type of resource requested by the user. The policy indicates the resource requested and the level of authentication required for accessing the resource. In various embodiments, the level of authentication required includes use of a push notification as a part of a single or multi-factor authentication, and thus the authentication service 155 and the distributed environment server 115 realize that a push notification needs to be sent to a registered authentication application (e.g., the second application 180) for approval.

At step 172, the distributed environment server 115 determines whether the user has registered an authentication application and/or client device with the access management system (e.g., the authentication service 155) or the distributed environment server 115 for push notification authentication. In the instance that the user has registered, then the distributed environment server 115 replies to the browser 132 or the first application 130 with a notification on the status of the request for access and a transaction unique identifier (ID). The notification allows for the first application 130 to know it should wait for either (i) receipt of a second push notification (a status message) concerning whether a first push notification (the authentication message) has been accepted or denied via the second application 180, or (ii) a time-out period to have expired. The transaction unique identifier allows the access management system to uniquely identify this transaction or request for access from the client 105 to the resource 120. In the instance that the user has not registered, then the distributed environment server 115 replies to the browser 132 or the first application 130 with a request to register an authentication application and/or client device with the access management system for push notification authentication.

At step 173, the notification publisher 185 composes a message for the first push notification, for example, an automatic message composed through a message composer, based on the authentication policy for the requested resource 120 and prepares notification data to be sent with the message. In some embodiments, the message is composed as a notification that a user is trying to access a resource and the server needs confirmation that the user is who they say they are; thus, prompting the user to accept or deny confirmation. In other embodiments, the message is a code or question prompted by the user trying to access a resource and the server needs the user to respond with the code or answer to confirm that the user is who they say they are; thus, prompting the user to provide the code or answer. The notification publisher 185 defines the audience such as the client device 105 or another client device to whom the first push notification will be sent. In certain embodiments, the notification publisher 185 may determine whether the first push notification should be sent immediately or in accordance with a schedule. In various embodiments, the notification data includes the unique identifiers for the second application 180 and/or the client device 105 or another client device and contents for a call back to the first application 130. The contents for the call back may include the unique identifiers for the first application 130 and/or the client device 105 and the transaction unique identifier. Thereafter, the notification publisher 185 sends the first push notification (message and notification data) to the push notification service 170 via the API 190, and the push notification service 170 receives the first push notification from the publisher 185.

At step 174, the push notification service 170 forwards the first push notification to the second application 180 on the client device 105 or another client device based on the unique identifiers for the second application 180 and/or the client device 105 or another client device. In various embodiments, the push notification service 170 unpacks the notification data from the first push notification and uses the unique identifiers for the second application 180 and/or the client device 105 or another client device to look up registration data for the client device 105 or another client device. The registration data includes information on how to contact the client device 105 or another client device such as an IP address. Thereafter, the second application 180 receives the first push notification, and parses the first push notification to obtain the notification data and the message. One of the benefits of push notifications is that they can be interactive and users can take action on messages in the notification by responding to the push notification. For example, the push notification may include a code or question that the user of the client device 105 or another client device can read, interpret and respond to via the second application 180 and/or the client device 105 or another client device. In its simplest form, the reply by the user may be acceptance or denial that the user did generate the request for access to resource 120 on the first application 130. In more complex forms, the reply may include a code embedded in the message or an answer to a question within the message that confirms the user did generate the request for access to resource 120 on the first application 130. In some embodiments, the user uses the second application 180 to prepare or compose the reply manually through a message composer user interface. It is to be understood that the reply may be generated immediately upon receipt of the first push notification, or if the user is distracted or busy, the reply may not be prepared or composed for some period of time.

At step 175, the second application 180 sends the reply along with the some or all of the notification data obtained from the first push notification to the notification publisher 185 of the authentication service 155 or the distributed environment server 115. In some embodiments, the notification data includes the contents for the call back, for example, the unique identifiers for the first application 130 and/or the client device 105 and the transaction unique identifier. In certain embodiments, the reply and the notification data are sent back in a signed format to the notification publisher 185. For example, the reply and the notification data are signed with a digital signature. The digital signature is a mathematical scheme for presenting the authenticity of digital messages and the notification data. A valid digital signature gives the notification publisher 185 reason to believe that a known sender created the message (authentication), that the sender cannot deny having sent the message (non-repudiation), and that the message was not altered in transit (integrity).

At step 176, the notification publisher 185 of the authentication service 155 or the distributed environment server 115, receives the signed reply and notification data. The notification publisher 185 recognizes the response based on the contents for the call back (e.g., the unique identifiers for the first application 130 and/or the client device 105 and the transaction unique identifier) and prepares a second push notification for the browser 132 or first application 130. The notification publisher 185 composes a message for the second push notification, for example, an automatic message composed through a message composer, based on the reply and the notification data received from the second application 180, and prepares notification data to be sent with the message to the push notification service 170 via the API 190. In some embodiments, the message is the status of the first push notification (e.g., accepted or denied) such that the first application 130 is aware of the status of the request for access to the resource. The notification publisher 185 defines the audience such as the client device 105 to whom the second push notification will be sent. In certain embodiments, the notification publisher 185 may determine whether the second push notification should be sent immediately or in accordance with a schedule. In various embodiments, the notification data includes the unique identifiers for the first application 130 and/or the client device 105 and the transaction unique identifier. Thereafter, the notification publisher 185 sends the second push notification (message and notification data) to the push notification service 170 via the API 190, and the push notification service 170 receives the second push notification from the publisher 185.

At step 177, the push notification service 170 forwards the second push notification to the first application 130 on the client device 105 based on the unique identifiers for the first application 130 and/or the client device 105. In various embodiments, the push notification service 170 unpacks the notification data from the second push notification and uses the unique identifiers for the first application 130 and/or the client device 105 to look up registration data for the client device 105. The registration data includes information on how to contact the client device 105 such as an IP address. Thereafter, in some embodiments, the browser 132 receives the second push notification and sends the second push notification as a browser notification to a listener of the first application 130 for processing. In some embodiments, the listener of the first application 130 directly receives the second push notification for processing.

At step 178, the listener of the of the first application 130 processes the second push notification. In some embodiments, the processing comprises parsing the second push notification to obtain the notification data and the message. The notification data lets the first application know which request the second push notification is referring to via the transaction unique identifier and the message tells the first application 130 the status of the request for access to the resource. Thereafter, the first application sends a notification to the authentication service 155 or the distributed environment server 115 to indicate the status of the request for access to the resource has been received and the first application is ready to access the resource. Accordingly, the use of the initial status notification in step 172, the transaction unique identifier, and the second push notification replaces the polling and request for status from the first application and/or browser in conventional systems.

At step 179, the authentication service 155 or the distributed environment server 115 received the notification. In various embodiments, the authentication service 155 validates all credentials of the user comprising, consisting, or consisting essentially of the response to the push notification. In the instance where the credentials are valid (e.g., the push notification was accepted), the authentication server 155 allows for the browser 132 and/or application 130 to access the resource 130 on the distributed environment server 115. In the instance where the credentials are not valid (e.g., the push notification was denied), the authentication server 155 denies access of the browser 132 and/or application 130 to the resource 130 on the distributed environment server 115.

Push Notification Processes

Figure 2:
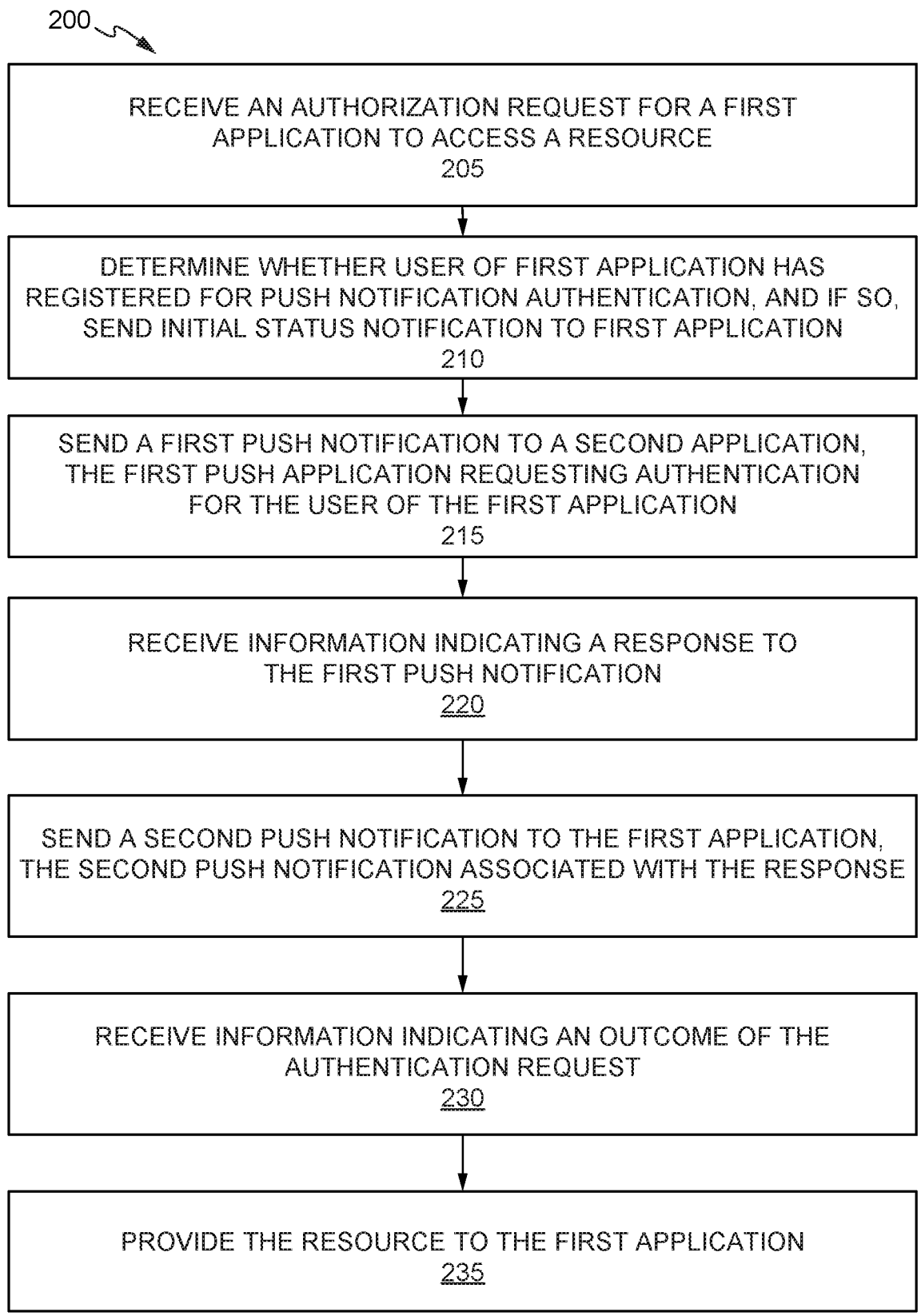
FIG. 2 depicts a flowchart illustrating a process for push notification authentication in accordance with various embodiments.

FIG. 2 illustrates a process and operation for push notification authentication according to various embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIG. 2 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 2 is not intended to be limiting. Other sequences of steps may also be performed according to alternative embodiments. For example, in alternative embodiments the steps outlined above may be performed in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 2 shows a flowchart 200 that illustrates a process for push notification authentication according to various embodiments. In some embodiments, the processes depicted in flowchart 200 may be implemented by the system of FIG. 1A and framework of FIG. 1B. At step 205, an authorization request is received at a server (e.g., the resource or distributed environment server 115 as described with respect to FIG. 1A) for a first application (e.g., a web application) to access a resource. At step 210, a determination is made by the server as to whether the user of the first application has registered the second application for push notification authentication. When the user has registered the second application for push notification authentication, the server sends an initial notification on the status of the authorization request and a transaction unique identifier to the first application. In some embodiments, the initial notification informs the first application that the authorization request requires the push notification authentication and wait for either: (i) receipt of the second push notification, or (ii) a time-out period to have expired. When the user has not registered the second application for push notification authentication, the server sends a notification to the first application letting the user know that they must first register a second application for push notification authentication.

At step 215, a first push notification is sent by the server to a second application (e.g., an authentication application). The first push notification requests authentication of a user of the first application. In some embodiments, the first application is on a first client device and the second application is on a second client device, and the first client device and the second client device are different devices. For example, the first client device may be a laptop or desktop computing device being used by the user to access the resource, and the second client device may be a mobile device registered by the user for second factor authentication such as push notifications. In other embodiments, the first application and the second application are on a same client device. In various embodiments, prior to sending the first push notification, the server composes a message for the first push notification. The message requests confirmation of an identity of the user. Additionally, the server may prepare notification data for the first push notification. The notification data includes a unique identifier for the second application and contents for a call back to the first application, and the contents for the call back include the transaction unique identifier. The server generates the first push notification using at least the message and the notification data. In some embodiments, the sending the first push notification comprises sending the first push notification to a push notification service via an application program interface, and the server is registered with the push notification service.

At step 220, information indicating a response to the first push notification is received at the server from the second application. In some embodiments, the response to the first push notification confirms the identity of the user, and the response to the first push notification is signed with a digital signature. At step 225, a second push notification is sent by the server to the first application. The second push notification includes a status of the authorization request based on the response to the first push notification. In various embodiments, prior to sending the second push notification, the server composes a message for the second push notification. The message includes the status of the authorization request based on the response to the first push notification. Additionally, the server may prepare notification data for the second push notification. The notification data includes a unique identifier for the first application and the transaction unique identifier. The server generates the second push notification using at least the message and the notification data. In some embodiments, the sending the second push notification comprises sending the second push notification to the push notification service via the application program interface, and the server is registered with the push notification service.

At step 230, information indicating an outcome of the authentication request is received at the server. The outcome is based at least on the response to the first push notification. In some embodiments, the outcome of the authentication request is a validation of credentials of the user, and the credentials include at least the response to the first push notification. At step 235, the first application is provided access to the resource by the server.

Figure 3:
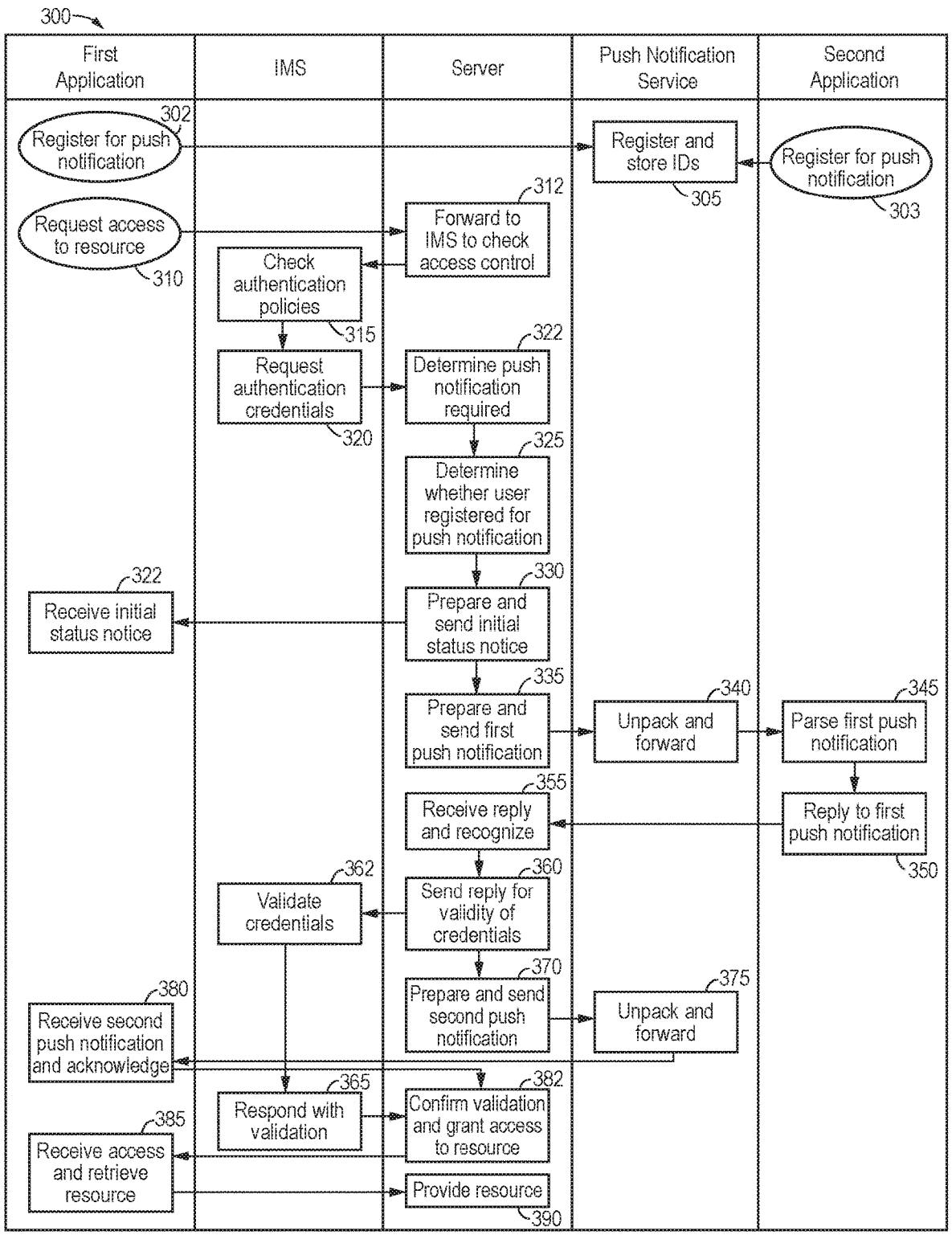
FIG. 3 depicts a flowchart illustrating a process for provisioning and utilization of push notification authentication in a distributed environment in accordance with various embodiments.

FIG. 3 illustrates a process and operation for provisioning and utilizing an access management system for push notification authentication within a distributed environment according to some embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIG. 3 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 3 is not intended to be limiting. Other sequences of steps may also be performed according to alternative embodiments. For example, in alternative embodiments the steps outlined above may be performed in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 3 shows a flowchart 300 that illustrates a process provisioning and utilizing an access management system for push notification authentication within a distributed environment according to various embodiments. In some embodiments, the processes depicted in flowchart 300 may be implemented by the system of FIG. 1A and framework of FIG. 1B. At step 302, a first application (e.g., a web application) may be registered with a push notification service to receive push notifications for authentication on the access management system. In some embodiments, the user registers the first application with the push notification service. In other embodiments, the first application registers itself with the push notification service. The registration process includes providing the push notification service with a unique identifier for the first application and/or a client device running the first application. At step 303, the second application (e.g., an authentication application) may be registered with the push notification service to receive push notifications for authentication on the access management system. In some embodiments, the user registers the second application with the push notification service. In other embodiments, the second application registers itself with the push notification service. The registration process includes providing the push notification service with a unique identifier for the second application and/or the client device running the second application. At step 305, the push notification service may register the first application and the second application. In some embodiments, the registration includes storing the unique identifiers for the first applications, the second application, associated client device(s), and/or information on how to contact the client device(s) such as an IP address. In certain embodiments, the push notification service shares the unique identifiers for the first applications, the second application, and/or associated client device(s) with a resource server (e.g., a distributed environment server), which has a publisher for providing push notifications to the first application and the second application.

At step 310, a user may operate the first application on the client device to request access to a resource controlled by the resource server. At step 312, the request may be routed to or intercepted by a security agent, which controls access to resource, and the security agent will query the access manager server to determine if the requested resource is protected. At step 315, the access manager server checks relevant authentication policies for the resource to determine whether authentication is required for access to the resource. If the requested resource is protected and requires authentication for use, the access manager server may determine whether any session exists for the user. Upon determining that no session has been established for the user, the user may be forwarded by the access manager server to a login service (e.g., authentication service) of the identity management system. At step 320, the authentication service may request authentication credentials (e.g., user name/password, accept or decline a push notification, or the like) from the user. At step 322, the resource server may determine that a push notification is required for the authentication credentials.

At step 325, the resource server may determine whether the user has registered an authentication application and/or client device with the access management system or the resource server for push notification authentication. In the instance that the user has registered, then at step 330 the resource server replies to the browser or the first application with a notification on the status of the request for access and a transaction unique identifier (ID). In the instance that the user has not registered, then the resource server replies to the browser or the first application with a request to register an authentication application and/or client device with the access management system for push notification authentication (as described with respect to steps 302-305). At step 332, the first application receives the notification. The notification allows for the first application to know it should wait for either (i) receipt of a second push notification (a status message) concerning whether a first push notification (the authentication message) has been accepted or denied via the second application, or (ii) a time-out period to have expired. The transaction unique identifier allows the access management system to uniquely identify this transaction or request for access from the client to the resource.

At step 335, the notification publisher of the resource server may compose a message for the first push notification based on the authentication policy for the requested resource and prepares notification data to be sent with the message. In some embodiments, the message is composed as a notification that a user is trying to access a resource and the server needs confirmation that the user is who they say they are; thus, prompting the user to accept or deny confirmation. In other embodiments, the message is a code or question prompted by the user trying to access a resource and the server needs the user to respond with the code or answer to confirm that the user is who they say they are; thus, prompting the user to provide the code or answer. In various embodiments, the notification data includes the unique identifiers for the second application and/or the client device running the second application and contents for a call back to the first application. The contents for the call back may include the unique identifiers for the first application and/or the client device and the transaction unique identifier. Thereafter, the notification publisher sends the first push notification (message and notification data) to the push notification service.

At step 340, the push notification service may receive the first push notification from the publisher, unpacks the notification data from the first push notification, and utilizes the unique identifiers for the second application and/or the client device or another client device to look up registration data for the client device or another client device. In some embodiments, the push notification service forwards the first push notification to the second application based on the unique identifiers for the second application and/or the client device or another client device. At step 345, the second application receives the first push notification, and parses the first push notification to obtain the notification data and the message. At step 350, the user may reply to the first push notification. In some embodiments, the user uses the second application to prepare or compose the reply manually through a message composer user interface. In its simplest form, the reply by the user may be acceptance or denial that the user did generate the request for access to resource on the first application. In more complex forms, the reply may include a code embedded in the message or an answer to a question within the message that confirms the user did generate the request for access to resource on the first application. In certain embodiments, the reply includes the contents for the call back, for example, the unique identifiers for the first application and/or the client device and the transaction unique identifier.

At step 355, the resource server may receive the reply to the first push notification. At step 360, the resource server may forward the reply to the authentication service for processing (e.g., validation of the credentials). At step 362, the authentication service may authenticate the user upon receiving the proper authentication credentials by validating the credentials against those stored in a user directory or identity store. At step 365, based on receiving the proper authentication credentials for the user, the access manager server may forward the user back to the security agent with credential validation. At step 370, the resource server prepares a second push notification for the browser or first application. In some embodiments, the notification publisher composes a message for the second push notification based on the reply and notification data received from the second application, and prepares notification data to be sent with the message to the push notification service. In some embodiments, the message is the status of the first push notification (e.g., accepted or denied) such that the first application is aware of the status of the request for access to the resource. In certain embodiments, the notification data includes the unique identifiers for the first application and/or the client device and the transaction unique identifier. Thereafter, the notification publisher sends the second push notification (message and notification data) to the push notification service.

At step 375, the push notification service may receive the second push notification from the publisher, unpacks the notification data from the second push notification, and utilizes the unique identifiers for the first application and/or the client device to look up registration data for the client device or another client device. In some embodiments, the push notification service forwards the second push notification to the first application based on the unique identifiers for the first application and/or the client device. At step 380, the first application receives the second push notification, and parses the second push notification to obtain the notification data and the message. The notification data lets the first application know which request the second push notification is referring to via the transaction unique identifier and the message tells the first application the status of the request for access to the resource. Thereafter, the first application sends a notification to the authentication service or the resource server to indicate the status of the request for access to the resource has been received and the first application is ready to access the resource. Accordingly, the use of the initial status notification, the transaction unique identifier, and the second push notification replaces the polling and request for status from the first application and/or browser in conventional systems.

At step 382, the security agent may check the authentication, and at step 385, establish a first session for user upon authentication of the user. As a result, the user is logged into the resource server for the session. Once logged in at step 390, the user may access the resource at and other resources to which the user is authorized to access, such as running different applications, accessing cloud storage, or the like. In some embodiments, once the user is logged into the resource server, the access manager server creates a cookie that tracks session activity for the user. The cookie may include a length of time that the user has been active on a session. The cookie may be stored as session activity data within the identity management system.

Illustrative Systems

Figure 4:
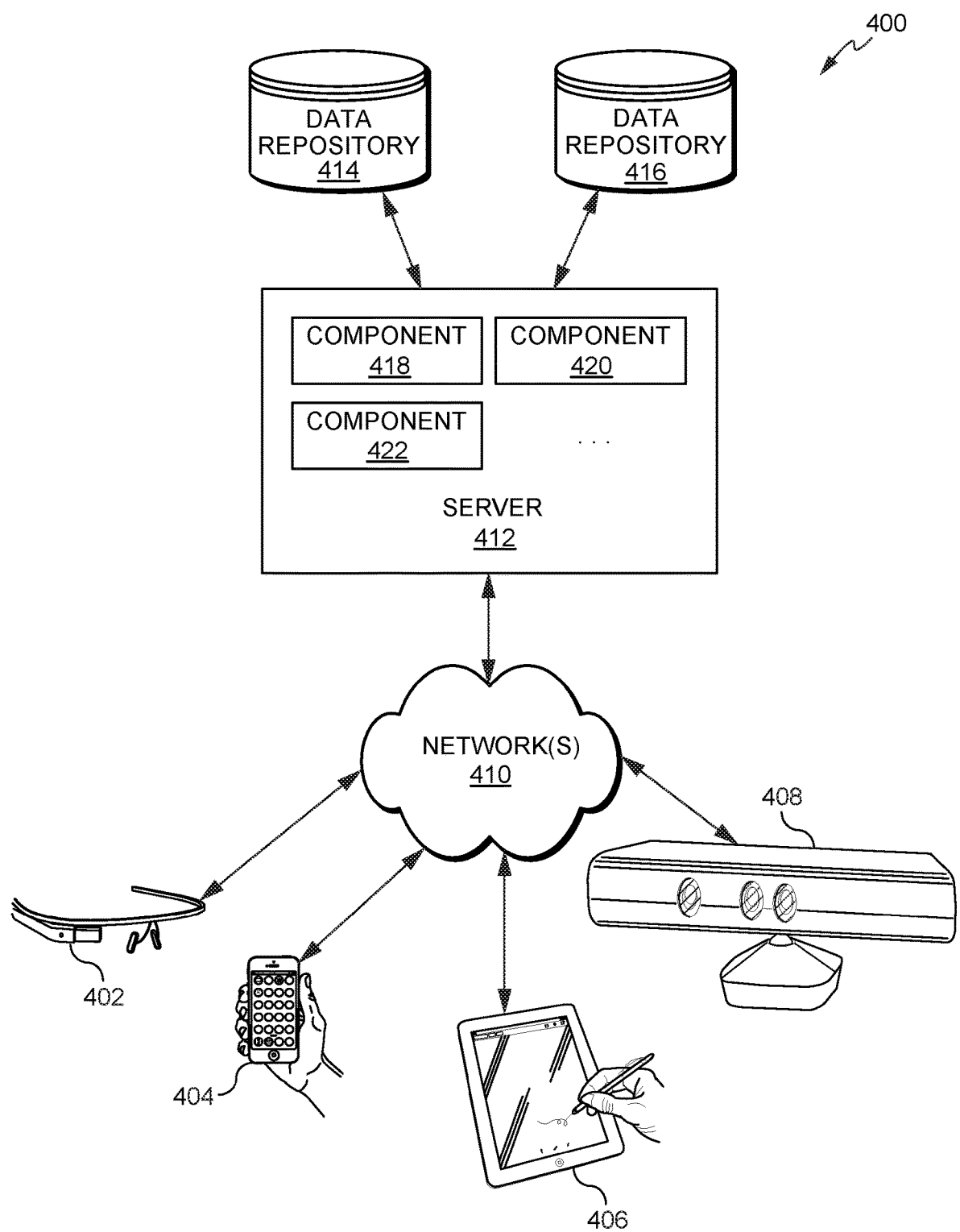
FIG. 4 illustrates a simplified diagram of a distributed system for implementing various embodiments.

FIG. 4 depicts a simplified diagram of a distributed system 400 for implementing an embodiment. In the illustrated embodiment, distributed system 400 includes one or more client computing devices 402, 404, 406, and 408, which are configured to execute and operate a client application such as a web browser, proprietary client (e.g., Oracle Forms), or the like over one or more network(s) 410. Server 412 may be communicatively coupled with remote client computing devices 402, 404, 406, and 408 via network 410.

In various embodiments, server 412 may be adapted to run one or more services or software applications such as services and applications that may manage session activity of SSO access in a distributed environment. In certain embodiments, server 412 may also provide other services or software applications can include non-virtual and virtual environments. In some embodiments, these services may be offered as web-based or cloud services or under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in FIG. 4, software components 418, 420 and 422 of system 400 are shown as being implemented on server 412. In other embodiments, one or more of the components of system 400 and/or the services provided by these components may also be implemented by one or more of the client computing devices 402, 404, 406, and/or 408. Users operating the client computing devices may then utilize one or more client applications to use the services provided by these components. These components may be implemented in hardware, firmware, software, or combinations thereof. It should be appreciated that various different system configurations are possible, which may be different from distributed system 400. The embodiment shown in FIG. 4 is thus one example of a distributed system for implementing an embodiment system and is not intended to be limiting.

Client computing devices 402, 404, 406, and/or 408 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 410.

Although distributed system 400 in FIG. 4 is shown with four client computing devices, any number of client computing devices may be supported. Other devices, such as devices with sensors, etc., may interact with server 412.

Network(s) 410 in distributed system 400 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network (s) 710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 412 can include one or more virtual machines running virtual operating systems, or other computing architectures involving virtualization. One or more flexible pools of logical storage devices can be virtualized to maintain virtual storage devices for the server. Virtual networks can be controlled by server 412 using software defined networking. In various embodiments, server 412 may be adapted to run one or more services or software applications described in the foregoing disclosure. For example, server 412 may correspond to a server for performing processing as described above according to an embodiment of the present disclosure.

Server 412 may run an operating system including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 412 may include one or more applications to analyze and consolidate data feeds and/or event updates received from users of client computing devices 402, 404, 406, and 408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more databases 414 and 416. These databases may provide a mechanism for storing information such as user profile information, authentication policies, authorization policies, authentication factors, and other information used in various embodiments described herein. Databases 414 and 716 may reside in a variety of locations. By way of example, one or more of databases 414 and 416 may reside on a non-transitory storage medium local to (and/or resident in) server 412. Alternatively, databases 414 and 416 may be remote from server 412 and in communication with server 412 via a network-based or dedicated connection. In one set of embodiments, databases 414 and 416 may reside in a storage-area network (SAN). Similarly, any necessary files for performing the functions attributed to server 412 may be stored locally on server 412 and/or remotely, as appropriate. In one set of embodiments, databases 414 and 416 may include relational databases, such as databases provided by Oracle that are adapted to store, update, and retrieve data in response to SQL-formatted commands.

Figure 5:
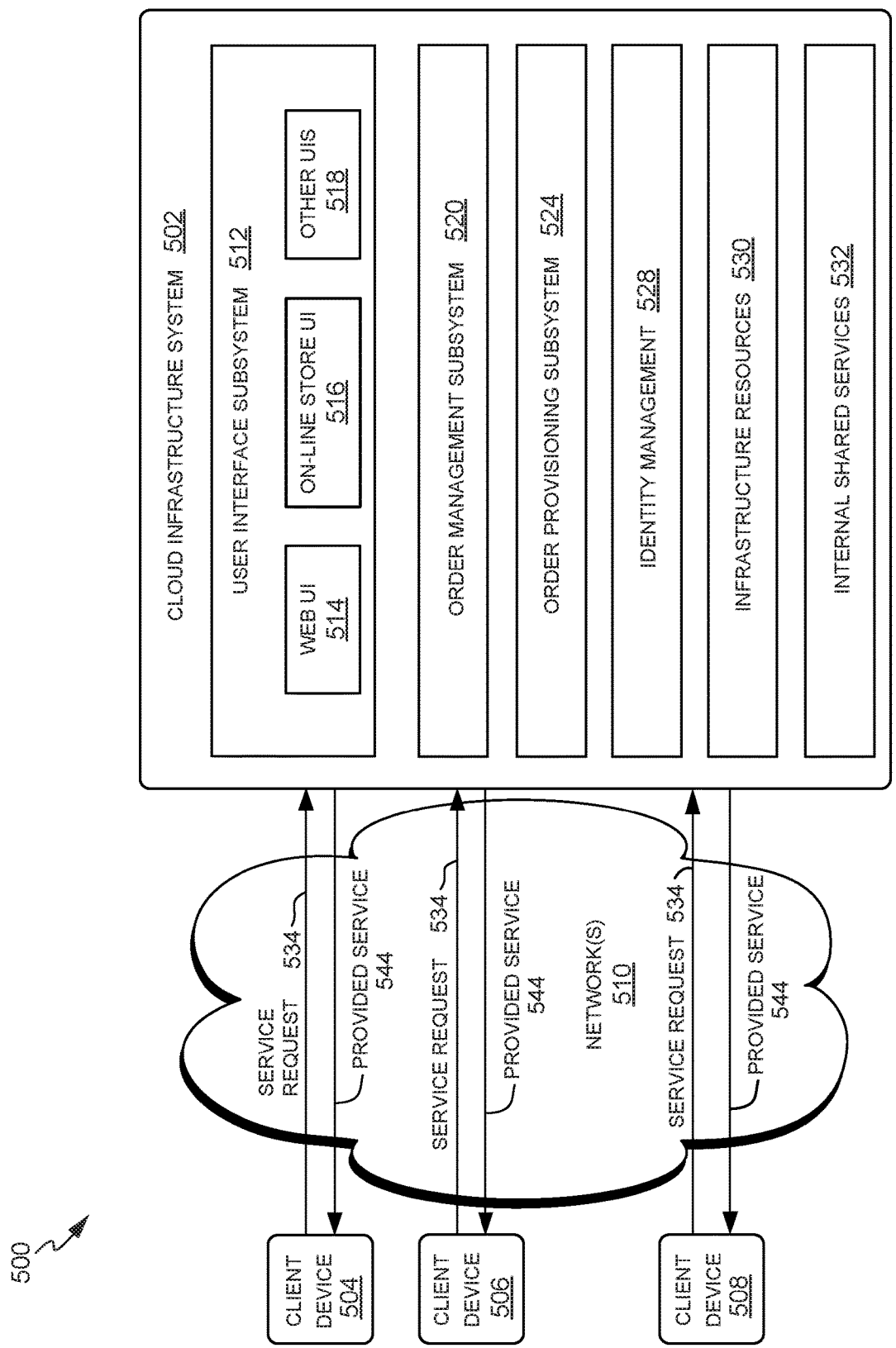
FIG. 5 illustrates a simplified block diagram of one or more elements of a system environment in which services may be offered as cloud services in accordance with various embodiments.

In some embodiments, a cloud environment may provide one or more services for managing session activity of SSO access in a distributed environment. FIG. 5 is a simplified block diagram of one or more components of a system environment 500 in which services may be offered as cloud services, in accordance with an embodiment of the present disclosure. In the illustrated embodiment in FIG. 5, system environment 500 includes one or more client computing devices 504, 506, and 508 that may be used by users to interact with a cloud infrastructure system 502 that provides cloud services, including services for managing session activity of SSO access in a distributed environment. Cloud infrastructure system 502 may comprise one or more computers and/or servers that may include those described above for server 412.

It should be appreciated that cloud infrastructure system 502 depicted in FIG. 5 may have other components than those depicted. Further, the embodiment shown in FIG. 5 is only one example of a cloud infrastructure system. In some other embodiments, cloud infrastructure system 502 may have more or fewer components than shown in the figure, may combine two or more components, or may have a different configuration or arrangement of components.

Client computing devices 504, 506, and 508 may be devices similar to those described above for client computing devices 402, 404, 406, and 408. Client computing devices 504, 506, and 508 may be configured to operate a client application such as a web browser, a proprietary client application (e.g., Oracle Forms), or some other application, which may be used by a user of the client computing device to interact with cloud infrastructure system 502 to use services provided by cloud infrastructure system 502. Although exemplary system environment 500 is shown with three client computing devices, any number of client computing devices may be supported. Other devices such as devices with sensors, etc. may interact with cloud infrastructure system 502.

Network(s) 510 may facilitate communications and exchange of data between client computing devices 504, 506, and 508 and cloud infrastructure system 502. Each network may be any type of network familiar to those skilled in the art that can support data communications using any of a variety of commercially-available protocols, including those described above for network(s) 410.

In certain embodiments, services provided by cloud infrastructure system 502 may include a host of services that are made available to users of the cloud infrastructure system on demand. In addition to services related to managing session activity of SSO access, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 502 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 502 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales.

Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 502 may be adapted to automatically provision, manage and track a customer's subscription to services offered by cloud infrastructure system 502. Cloud infrastructure system 502 may provide the cloud services via different deployment models. For example, services may be provided under a public cloud model in which cloud infrastructure system 502 is owned by an organization selling cloud services (e.g., owned by Oracle Corporation) and the services are made available to the general public or different industry enterprises. As another example, services may be provided under a private cloud model in which cloud infrastructure system 502 is operated solely for a single organization and may provide services for one or more entities within the organization. The cloud services may also be provided under a community cloud model in which cloud infrastructure system 502 and the services provided by cloud infrastructure system 502 are shared by several organizations in a related community. The cloud services may also be provided under a hybrid cloud model, which is a combination of two or more different models.

In some embodiments, the services provided by cloud infrastructure system 502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 502. Cloud infrastructure system 502 then performs processing to provide the services in the customer's subscription order.

In some embodiments, the services provided by cloud infrastructure system 502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 502 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 502 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 502 may also include infrastructure resources 530 for providing the resources used to provide various services to customers of the cloud infrastructure system. In one embodiment, infrastructure resources 530 may include pre-integrated and optimized combinations of hardware, such as servers, storage, and networking resources to execute the services provided by the PaaS platform and the SaaS platform, and other resources.

In some embodiments, resources in cloud infrastructure system 502 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 532 may be provided that are shared by different components or modules of cloud infrastructure system 502 to enable provision of services by cloud infrastructure system 502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 502, and the like.

In one embodiment, as depicted in FIG. 5, cloud management functionality may be provided by one or more modules, such as an order management module 520, an order orchestration module 522, an order provisioning module 524, an order management and monitoring module 526, and an identity management module 528. These modules may include or be provided using one or more computers and/or servers, which may be general purpose computers, specialized server computers, server farms, server clusters, or any other appropriate arrangement and/or combination.

In an exemplary operation, at step 534, a customer using a client device, such as client computing devices 804, 806 or 808, may interact with cloud infrastructure system 502 by requesting one or more services provided by cloud infrastructure system 502 and placing an order for a subscription for one or more services offered by cloud infrastructure system 502. In certain embodiments, the customer may access a cloud User Interface (UI) such as cloud UI 512, cloud UI 514 and/or cloud UI 516 and place a subscription order via these UIs. The order information received by cloud infrastructure system 502 in response to the customer placing an order may include information identifying the customer and one or more services offered by the cloud infrastructure system 802 that the customer intends to subscribe to.

At step 536, the order information received from the customer may be stored in an order database 518. If this is a new order, a new record may be created for the order. In one embodiment, order database 518 can be one of several databases operated by cloud infrastructure system 518 and operated in conjunction with other system elements.

At step 538, the order information may be forwarded to an order management module 520 that may be configured to perform billing and accounting functions related to the order, such as verifying the order, and upon verification, booking the order.

At step 540, information regarding the order may be communicated to an order orchestration module 522 that is configured to orchestrate the provisioning of services and resources for the order placed by the customer. In some instances, order orchestration module 522 may use the services of order provisioning module 524 for the provisioning. In certain embodiments, order orchestration module 522 enables the management of business processes associated with each order and applies business logic to determine whether an order should proceed to provisioning.

As shown in the embodiment depicted in FIG. 5, at step 542, upon receiving an order for a new subscription, order orchestration module 522 sends a request to order provisioning module 524 to allocate resources and configure resources needed to fulfill the subscription order. Order provisioning module 524 enables the allocation of resources for the services ordered by the customer. Order provisioning module 524 provides a level of abstraction between the cloud services provided by cloud infrastructure system 500 and the physical implementation layer that is used to provision the resources for providing the requested services. This enables order orchestration module 522 to be isolated from implementation details, such as whether or not services and resources are actually provisioned on the fly or pre-provisioned and only allocated/assigned upon request.

At step 544, once the services and resources are provisioned, a notification may be sent to the subscribing customers indicating that the requested service is now ready for use. In some instance, information (e.g. a link) may be sent to the customer that enables the customer to start using the requested services.

At step 546, a customer's subscription order may be managed and tracked by an order management and monitoring module 526. In some instances, order management and monitoring module 526 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 500 may include an identity management module 528 that is configured to provide identity services, such as access management and authorization services in cloud infrastructure system 500. In some embodiments, identity management module 528 may control information about customers who wish to utilize the services provided by cloud infrastructure system 502. Such information can include information that authenticates the identities of such customers and information that describes which actions those customers are authorized to perform relative to various system resources (e.g., files, directories, applications, communication ports, memory segments, etc.) Identity management module 528 may also include the management of descriptive information about each customer and about how and by whom that descriptive information can be accessed and modified.

Figure 6:
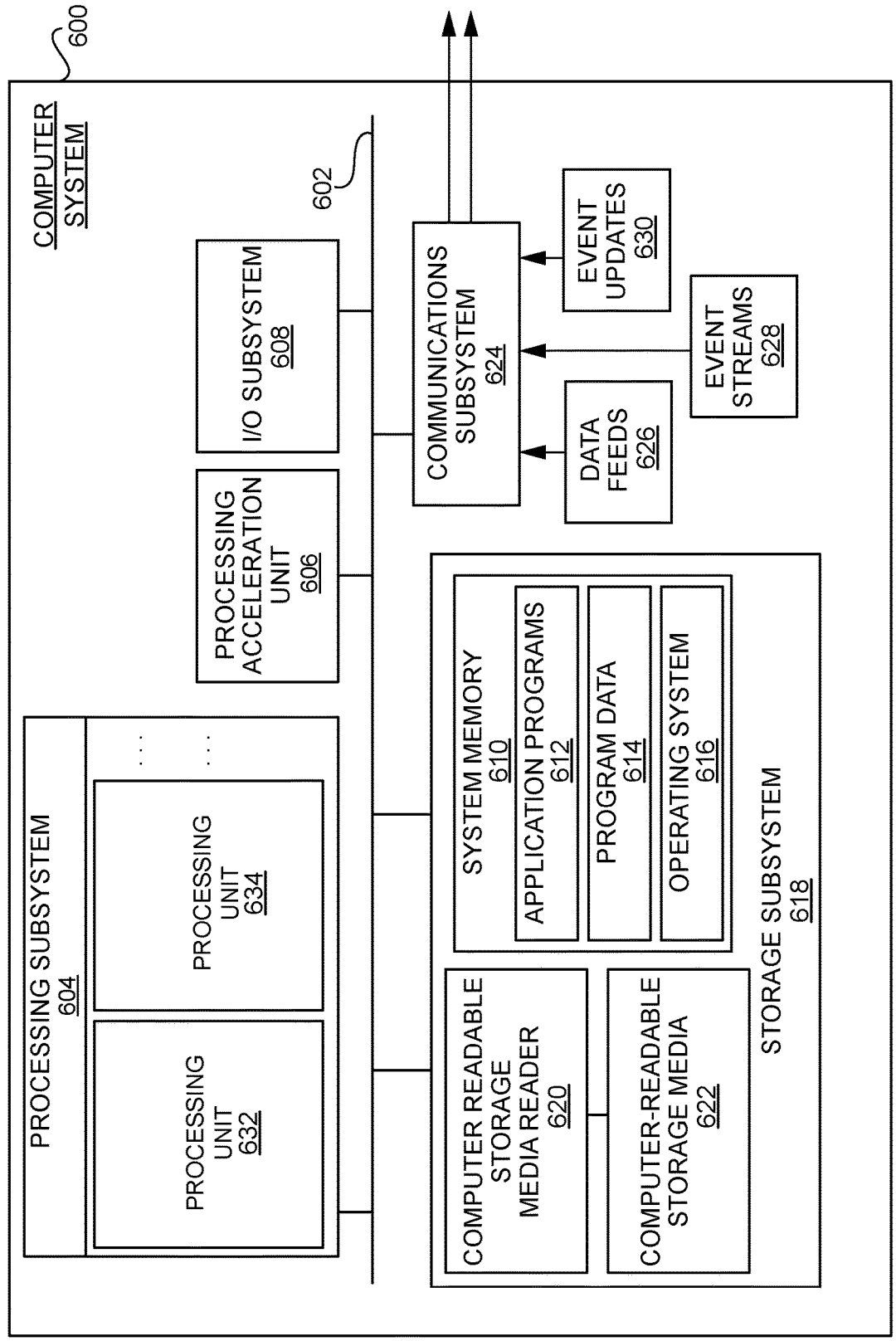
FIG. 6 illustrates an exemplary computer system that may be used to implement certain elements according to various embodiments.

FIG. 6 illustrates an exemplary computer system 600 that may be used to implement various embodiments described herein. In some embodiments, computer system 600 may be used to implement any of the various servers and computer systems described above. As shown in FIG. 6, computer system 600 includes various subsystems including a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 may include tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processing units 632, 634, etc. A processing unit may include be one or more processors, including single core or multicore processors, one or more cores of processors, or combinations thereof. In some embodiments, processing subsystem 604 can include one or more special purpose co-processors such as graphics processors, digital signal processors (DSPs), or the like. In some embodiments, some or all of the processing units of processing subsystem 604 can be implemented using customized circuits, such as application specific integrated circuits (ASICs), or field programmable gate arrays (FPGAs).

In some embodiments, the processing units in processing subsystem 604 can execute instructions stored in system memory 610 or on computer readable storage media 622. In various embodiments, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities described above for managing session activity of SSO access in a distributed environment.

In certain embodiments, a processing acceleration unit 606 may be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term "input device" is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 618 provides a repository or data store for storing information that is used by computer system 600. Storage subsystem 618 provides a tangible non-transitory computer-readable storage medium for storing the basic programming and data constructs that provide the functionality of some embodiments. Software (programs, code modules, instructions) that when executed by processing subsystem 604 provide the functionality described above may be stored in storage subsystem 618. The software may be executed by one or more processing units of processing subsystem 604. Storage subsystem 618 may also provide a repository for storing data used.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM) or dynamic random access memory (DRAM).

By way of example, and not limitation, as depicted in FIG. 6, system memory 610 may store application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 622 may store programming and data constructs that provide the functionality of some embodiments. Software (programs, code modules, instructions) that when executed by processing subsystem 604 a processor provide the functionality described above may be stored in storage subsystem 618. By way of example, computer-readable storage media 622 may include non-volatile memory such as a hard disk drive, a magnetic disk drive, an optical disk drive such as a CD ROM, DVD, a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 622 may provide storage of computer-readable instructions, data structures, program modules, and other data for computer system 800.

In certain embodiments, storage subsystem 600 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for storing computer-readable information.

In certain embodiments, computer system 600 may provide support for executing one or more virtual machines. Computer system 600 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 600. Accordingly, multiple operating systems may potentially be run concurrently by computer system 600. Each virtual machine generally runs independently of the other virtual machines.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client computing devices via the Internet for receiving and sending information from and to the client computing devices.

Communication subsystem 624 may support both wired and/or wireless communication protocols. For example, in certain embodiments, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

Communication subsystem 624 can receive and transmit data in various forms. For example, in some embodiments, communications subsystem 624 may receive input communication in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the invention. The modifications include any relevant combination of the disclosed features. The embodiments described herein are not restricted to operation within certain specific data processing environments, but are free to operate within a plurality of data processing environments. Additionally, although certain embodiments have been described using a particular series of transactions and steps, it should be apparent to those skilled in the art that the scope of such embodiments is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of such embodiments. The various embodiments described herein may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
    receiving, at a server, an authorization request for a first application to access a resource;
    determining, by the server, whether a user of the first application has registered a second application for push notification authentication;
    when the user has registered the second application for the push notification authentication, sending, by the server, an initial notification on a status of the authorization request and a transaction unique identifier to the first application;
    sending, by the server, a first push notification to the second application, the first push notification requesting authentication of the user of the first application;
    receiving, at the server, information indicating a response to the first push notification;
    sending, by the server, a second push notification to the first application, the second push notification includes the transaction unique identifier and an updated status of the authorization request based on the response to the first push notification;
    in response to sending the second push notification, receiving, at the server, acknowledgment from the first application that the second push notification was received and the first application is ready to access the resource; and
    in response to receiving the acknowledgment from the first application, providing, by the server, the first application access to the resource.

2. The method of claim 1,
    wherein the initial notification informs the first application that the authorization request requires the push notification authentication and wait for either: (i) receipt of the second push notification, or (ii) a time-out period to have expired.

3. The method of claim 2, further comprising:
    composing, by the server, a message for the first push notification, wherein the message requests confirmation of an identity of the user; and
    preparing, by the server, notification data for the first push notification, wherein the notification data includes a unique identifier for the second application and contents for a call back to the first application, and wherein the contents for the call back include the transaction unique identifier; and
    generating, by the server, the first push notification using at least the message and the notification data.

4. The method of claim 3, wherein the sending the first push notification comprises sending, by the server, the first push notification to a push notification service via an application program interface, and wherein the server is registered with the push notification service.

5. The method of claim 3, wherein the response to the first push notification confirms the identity of the user, and the response to the first push notification is signed with a digital signature.

6. The method of claim 5, further comprising:
    composing, by the server, a message for the second push notification, wherein the message includes the status of the authorization request based on the response to the first push notification; and
    preparing, by the server, notification data for the second push notification, wherein the notification data includes a unique identifier for the first application and the transaction unique identifier; and
    generating, by the server, the second push notification using at least the message and the notification data.

7. The method of claim 6, wherein the outcome of the authentication request is a validation of credentials of the user, and wherein the credentials include at least the response to the first push notification.

8. A system comprising:
    a distributed environment that includes a server comprising a resource, one or more processors, and non-transitory machine readable storage medium having instructions stored thereon that when executed by the one or more processors cause the one or more processors to perform a process comprising:
    receiving, at the server, an authorization request for a first application on a client device to access the resource;
    determining, by the server, whether a user of the first application has registered a second application for push notification authentication;
    when the user has registered the second application for the push notification authentication, sending, by the server, a first push notification to the second application via a push notification service, the first push notification requesting authentication of the user of the first application;
    receiving, at the server, information indicating a response to the first push notification;
    sending, by the server, a second push notification to the first application via the push notification service, the second push notification includes a status of the authorization request based on the response to the first push notification;
    receiving, at the server, information indicating an outcome of the authentication request based at least on the response to the first push notification; and
    providing, by the server, the first application access to the resource.

9. The system of claim 8, wherein
    the initial notification informs the first application that the authorization request requires the push notification authentication and wait for either: (i) receipt of the second push notification, or (ii) a time-out period to have expired.

10. The system of claim 9, wherein the process further comprises:
    composing, by the server, a message for the first push notification, wherein the message requests confirmation of an identity of the user; and
    preparing, by the server, notification data for the first push notification, wherein the notification data includes a unique identifier for the second application and contents for a call back to the first application, and wherein the contents for the call back include the transaction unique identifier; and generating, by the server, the first push notification using at least the message and the notification data.

11. The system of claim 10, wherein the sending the first push notification comprises sending, by the server, the first push notification to the push notification service via an application program interface, and wherein the server is registered with the push notification service.

12. The system of claim 10, wherein the response to the first push notification confirms the identity of the user, and the response to the first push notification is signed with a digital signature.

13. The system of claim 12, wherein the process further comprises:

composing, by the server, a message for the second push notification, wherein the message includes the status of the authorization request based on the response to the first push notification; and preparing, by the server, notification data for the second push notification, wherein the notification data includes a unique identifier for the first application and the transaction unique identifier; and generating, by the server, the second push notification using at least the message and the notification data.

14. The system of claim 13, wherein the outcome of the authentication request is a validation of credentials of the user, and wherein the credentials include at least the response to the first push notification.

15. A non-transitory machine readable storage medium having instructions stored thereon that when executed by one or more processors cause the one or more processors to perform a method comprising:

receiving an authorization request for a first application to access a resource;

determining whether a user of the first application has registered a second application for push notification authentication;

when the user has registered the second application for the push notification authentication, sending a first push notification to the second application via a push notification service, the first push notification requesting authentication of the user of the first application;

receiving information indicating a response to the first push notification;

sending a second push notification to the first application, the second push notification includes a status of the authorization request based on the response to the first push notification;

receiving information indicating an outcome of the authentication request based at least on the response to the first push notification; and providing the first application access to the resource.

16. The non-transitory machine readable storage medium of claim 15, wherein the initial notification informs the first application that the authorization request requires the push notification authentication and wait for either: (i) receipt of the second push notification, or (ii) a time-out period to have expired.

17. The non-transitory machine readable storage medium of claim 16, wherein the method further comprises:

composing a message for the first push notification, wherein the message requests confirmation of an identity of the user; and preparing notification data for the first push notification, wherein the notification data includes a unique identifier for the second application and contents for a call back to the first application, and wherein the contents for the call back include the transaction unique identifier; and generating the first push notification using at least the message and the notification data.

18. The non-transitory machine readable storage medium of claim 17, wherein the response to the first push notification confirms the identity of the user, and the response to the first push notification is signed with a digital signature.

19. The non-transitory machine readable storage medium of claim 18, wherein the method further comprises:

composing a message for the second push notification, wherein the message includes the status of the authorization request based on the response to the first push notification; and preparing notification data for the second push notification, wherein the notification data includes a unique identifier for the first application and the transaction unique identifier; and generating the second push notification using at least the message and the notification data.

20. The non-transitory machine readable storage medium of claim 19, wherein the outcome of the authentication request is a validation of credentials of the user, and wherein the credentials include at least the response to the first push notification.

* * * * *